United States Patent
Vadrevu et al.

(10) Patent No.: US 9,916,364 B2
(45) Date of Patent: Mar. 13, 2018

(54) PERSONALIZATION OF NEWS ARTICLES BASED ON NEWS SOURCES

(71) Applicant: YAHOO HOLDINGS, INC., Sunnyvale, CA (US)

(72) Inventors: Srinivas Vadrevu, Milpitas, CA (US); Su-Lin Wu, San Carlos, CA (US); Ben Shahshahani, Menlo Park, CA (US)

(73) Assignee: YAHOO HOLDINGS, INC., Sunnyvale, CA (US)

( * ) Notice: Subject to any disclaimer, the term of this patent is extended or adjusted under 35 U.S.C. 154(b) by 0 days.

(21) Appl. No.: 14/249,055

(22) Filed: Apr. 9, 2014

(65) Prior Publication Data

US 2014/0222800 A1    Aug. 7, 2014

Related U.S. Application Data

(63) Continuation of application No. 13/419,091, filed on Mar. 13, 2012, now Pat. No. 8,745,081.

(51) Int. Cl.
*G06F 17/30* (2006.01)

(52) U.S. Cl.
CPC ...... *G06F 17/3053* (2013.01); *G06F 17/3087* (2013.01); *G06F 17/30477* (2013.01); *G06F 17/30864* (2013.01); *G06F 17/30867* (2013.01); *G06F 17/30705* (2013.01)

(58) Field of Classification Search
CPC ......... G06F 17/30864; G06F 17/30477; G06F 17/30705
See application file for complete search history.

(56) References Cited

U.S. PATENT DOCUMENTS

| | | | |
|---|---|---|---|
| 7,516,085 B2* | 4/2009 | Bailey | G06Q 10/06315 705/35 |
| 8,332,396 B1* | 12/2012 | Srinivasaiah | G06Q 30/02 707/723 |
| 9,098,545 B2* | 8/2015 | Abhyanker | G06Q 10/10 |
| 2004/0111743 A1* | 6/2004 | Moncreiff | H04N 7/165 725/35 |
| 2008/0244046 A1* | 10/2008 | Campbell | H04W 4/02 709/222 |
| 2010/0115572 A1* | 5/2010 | Chen | H04L 9/3234 725/131 |
| 2010/0131501 A1* | 5/2010 | Deeming | G06F 17/30241 707/724 |
| 2011/0010336 A1* | 1/2011 | Johnson | G06F 17/30 707/609 |
| 2011/0238762 A1* | 9/2011 | Soni | G01C 21/3679 709/206 |
| 2011/0279311 A1* | 11/2011 | Hamano | G06F 17/30265 342/357.25 |
| 2012/0158711 A1* | 6/2012 | Curtiss | G06F 17/30864 707/723 |

(Continued)

*Primary Examiner* — Jared M Bibbee
(74) *Attorney, Agent, or Firm* — James J. DeCarlo; Greenberg Traurig, LLP (57) ABSTRACT

News search and browse experience is personalized based on user preferences. User attributes like a geographic location are obtained and news sources preferred by other users with attributes similar to those of a requesting user are identified. News sources that are popular across different user groups are eliminated and relevant news items from the remaining news sources are retrieved and presented to the requesting user.

23 Claims, 9 Drawing Sheets

(56) References Cited

U.S. PATENT DOCUMENTS

| | | | |
|---|---|---|---|
| 2012/0245982 A1* | 9/2012 | Daniel | G06Q 30/02 705/14.4 |
| 2012/0290637 A1* | 11/2012 | Perantatos | G06Q 10/10 709/203 |
| 2013/0031489 A1* | 1/2013 | Gubin | G06Q 10/10 715/753 |
| 2013/0041893 A1* | 2/2013 | Strike | G06F 17/3089 707/723 |
| 2013/0159294 A1* | 6/2013 | Curtiss | G06F 17/30864 707/723 |
| 2015/0234839 A1* | 8/2015 | Ho | G06F 17/3089 709/217 |

* cited by examiner

Most Discriminative (tf-idf)

chicagotribune.com:

| | |
|---|---|
| DMA Chicago | 62.4004118964 |
| IL | 59.091927698 |
| TX | 31.6766499981 |
| MI | 26.2647196232 |
| CA | 26.2589547631 |
| DMA Dallas-Ft. Worth | 25.2322826239 |
| IN | 25.0659579389 |
| DMA Detroit | 24.9360992454 |
| DMA Los Angeles | 24.1977161342 |
| WI | 23.0727712261 | chicago.metromix.com:

| | |
|---|---|
| DMA Biloxi-Gulfport | 4.15421377492 |
| DMA Bakersfield | 3.5352040246 |
| NY | 2.71457444619 |
| MS | 2.71273047681 |
| DMA New York | 2.57119823139 |
| DMA Los Angeles | 1.02243870989 |
| CA | 0.88265394 1618 |
| f | 0.643365252401 |
| m | 0.169260976599 | chicagoist.com:

| | |
|---|---|
| DMA Chicago | 7.94187060499 |
| IL | 7.73822862712 |
| DMA Miami-Ft. Lauderdale | 4.14834953243 |
| VT | 3.664604 0648 |
| DMA Burlington-Plattsburgh | 3.59829823213 |
| DMA Peoria-Bloomington | 3.50708314638 |
| DMA Santa Barbara-Santa Maria-San Luis Obispo | 3.28978785498 |
| DMA Youngstown | 3.27031240348 |
| DMA Buffalo | 2.97418100397 |
| DMA Greensboro-High Point-Winston Salem | 2.76938650929 |

FIG. 4a

Most Discriminative (tf-idf)

DMA San Francisco-Oakland-San Jose:

| | |
|---|---|
| ktvu.com | 117.56932666 |
| contracostatimes.com | 88.6120117862 |
| sanfrancisco.cbslocal.com | 74.2258688896 |
| mercurynews.com | 69.0854592236 |
| sfgate.com | 56.0785505451 |
| sfexaminer.com | 51.43626357 |
| sacbee.com | 50.1221586776 |
| news.yahoo.com | 49.3349298186 |
| abclocal.go.com | 48.4306748795 |
| nbcbayarea.com | 44.5881802949 |

PERSONALIZATION OF NEWS ARTICLES BASED ON NEWS SOURCES

This application is a continuation of and claims the benefit of U.S. patent application Ser. No. 13/419,091, filed Mar. 13, 2012, which is incorporated herein by reference in its entirety.

FIELD

The present disclosure relates to personalizing news search for users based on their preferred news sources.

BACKGROUND

Advances in Science and Technology have brought about new modalities of communication. Most recently, the Internet has proved to be a powerful medium of communication that delivers news even as it is occurring. Different news publishers are constantly vying for presence on the Internet by capturing user interests. Customizing their news presentations so that the news items are rated higher on search engines and news portals is one way that the news sources can build their readership.

SUMMARY

This disclosure describes systems and methods to automatically identify preferred news sources of users based on user profile data that includes attributes such as user location, age, gender and explicit or implicitly declared interests. Therefore, the user preferences can easily be captured in terms of their preferences in news sources.

In an embodiment, a method of providing news is disclosed. A request for news articles is received from a user. The request can be an explicit request comprising search terms or an implicit request wherein the user accesses a news website. Profile data of the requesting user including the user's geographic location is determined. User logs comprising interaction data including prior selections of other users and/or the user with respect to various news sources along with the users' profile data are accessed and the geographic location of the requesting user is employed to identify a user group having similar profile data as the requesting user from user logs. Among the news sources selected by the user group, those news sources that tend to be popular across a plurality of user groups are eliminated. A subset of the news sources that are particularly popular among the user group with similar profile data as the requesting user are selected as preferred news sources of the user. It has been identified that the preferred news sources for the requesting user comprise those sources that predominantly publish news items associated with the geographic location of the requesting user. The selection of news sources can also depend on additional profile data of the user such as the user age, gender or declared interests. The relevant news items from the preferred news sources are retrieved and transmitted for presentation to the user.

In another embodiment, a computing device, comprising a processor and a storage medium for tangibly storing thereon modules of a personalized news engine, the modules comprising the program logic for execution by the processor is disclosed. The modules comprised within the personalized news engine include an input module, an analysis module and an output module. The input module determines profile data comprising geographic location information of the user. In different aspects, the geographic location information of the user is derived from a DMA (Designated Market Area) associated with an IP (Internet Protocol) address of a device employed by the user or from the GPS (Global Positioning System) coordinates of the user device. The profile data can also additionally comprise age, gender and explicitly or implicitly declared interests of the user. The profile data from the input module is analyzed by the analysis module that selects sources of relevant news items from user logs that comprise other users' and/or the user's prior selections. The logs may also optionally comprise the user's prior selections. The news sources are selected based on prior selections made by other users having respective profile data similar to the profile data of the requesting user. The output module subsequently transmits, the relevant new items from the selected sources for display to the user. The personalized news engine can also comprise a feedback module that receives the user's selections of the relevant news items for storage to the user logs.

In a further embodiment, the analysis module within the personalized news engine further comprises a computation module. The computation module groups users from the user logs into a plurality of user groups based on respective user attributes. News sources that are commonly popular across the plurality of user groups are eliminated in order to determine news sources that are particularly popular among each of the plurality of user groups. The sources of news items are selected such that the sources primarily publish news items that are associated with the geographic location of the user.

In another embodiment, a computer-readable storage medium tangibly storing thereon computer program instructions capable of being executed by a computer processor is disclosed. The computer program instructions facilitate receiving, by a processor, a request for news articles from a user. The processor determines the geographic location of the user based upon which it identifies from user logs sources of news items selected by other users with respective geographic locations that are determined to match the user's geographic location. The user logs comprise profile data and prior selections of other users. They can optionally comprise prior selections of the requesting user. A subset of the news sources selected by other users whose profile data matches that of the requesting user is obtained by the processor which eliminates news sources that tend to be popular across a plurality of user groups. Therefore, a subset of new sources that are particularly popular among the user group with similar geographic location as the requesting user are selected as the preferred news sources for the requesting user. It was identified that such preferred news sources comprise those sources that publish news items associated with the geographic location of the user. The relevant news items from the preferred news sources are obtained and transmitted for presentation to the user.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered or cloud based complex of processors and associated network and storage devices, as well as operating software and one or more database systems and applications software which support the services provided by the server.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like. Client devices can also be computing devices.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

News-savvy users typically express their bias towards news sources or Web sites which match their interests. The search engines and news portals are mainly focused on clustering the users and documents and using collaborative filtering like techniques to match users against news documents. These systems rely on content based features of clustering and in matching users with their interests. Other systems rely on declared user interests in personalizing the news content that is relevant to the user. It is observed from analyzing user behavior that users prefer to read news from their local new sources. In addition, a strong correlation was also observed between user age/gender attributes and preferences in news sources. Various embodiments described herein relate to personalizing the news search and browse experience for users based on their preferences in selected news sources.

Figure 1:
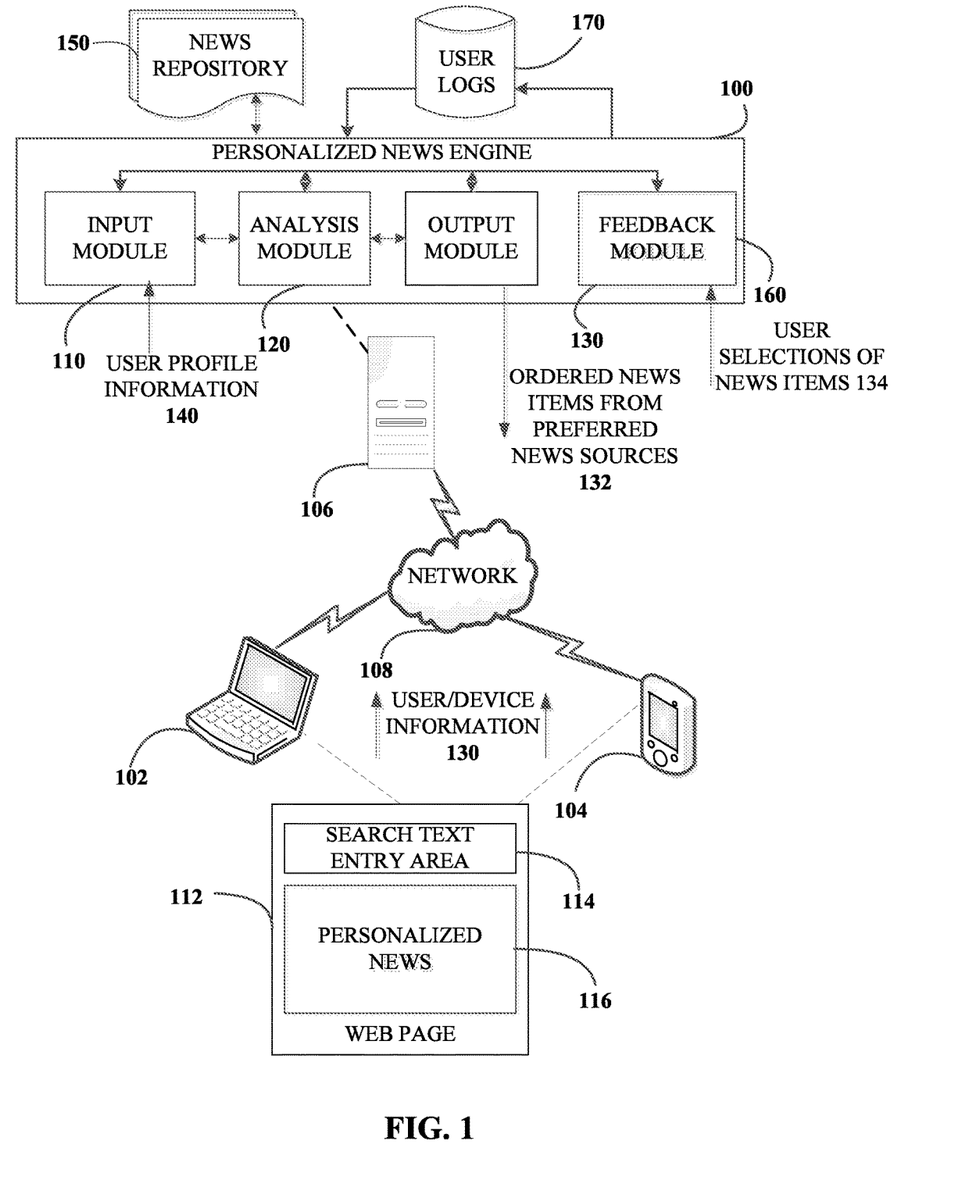
FIG. 1 is a block diagram of a user computer communicating with a server computer over a network in accordance with an embodiment of the present disclosure.

FIG. 1 is a block diagram of an embodiment wherein a user computing device/client device 102 or 104 communicates with a server computer 106 executing a personalized news engine 100, over a network 108 such as the Internet. The client devices 102/104 are employed by users to display a web page 112 via a web browser. The web page 112 (e.g., Yahoo!®, Bing®, or Google®) includes a search query entry area 114 where a user can enter a search query. In addition, the web page 112 also comprises a results area 116 where data such as information perceived to be relevant to a user based on user profile or results responsive to a user query are displayed. Different embodiments described herein facilitate personalization of news such that relevant news items from users' preferred news sources are displayed in the results area 116.

The user computer(s) or client devices 102/104 are configured to transmit user and/or device information 130 automatically based on preset user preferences or they can transmit information explicitly entered by the user, such as, a user query entered into the query entry area 114 or user identification information when the user logs in to the personalized news engine 100 which comprises one or more intercommunicating function elements or modules described hereinbelow, which can be executed by the server computer 106. The input module 110, comprised within the personalized news engine 100, determines user profile information 140 on receiving the user/device information 130. In different embodiments, the user profile information 140 can be obtained directly from the user/device information 130 if the user is logged in. In other embodiments, the user profile information 140 may have to be derived from contextual and/or temporal aspects of the user/device information 130 if the user is not logged in to the personalized news engine 100. For example, information associated with the user can be derived from the GPS (Global Positioning System) information of the device 104 or an IP address of a user machine 102 as will further detailed herein. In addition, other information regarding the user can be obtained by bcookies which are installed on the user computer(s) 102/104. Based on user preferences or settings, different kinds of user information such as location, user age, gender, explicitly declared user interests, social networking information associated with the user can be obtained explicitly from the user profile or can be derived from user/device information 130 in order to be transmitted as user profile information 140 to the analysis module 120. In addition, the personalized new engine 100 can be communicatively coupled with user logs 170 that store information regarding users including user profile information and/or user selections. Accordingly, the user profile information 140 thus obtained by the input module 110 can also be stored in the user logs 170.

The analysis module 120 employs the user profile information 140 to present personalized news, selected from a news repository 150, in the results area 116 of the web page 112 to users. In one embodiment, the personalized news can be news items which are selected based on user search criteria entered into the search query entry area 114 of the web page 112. In another embodiment, the personalized news included in the results area 116 can be news stories which are automatically selected by the personalized news engine 100 based on known or derived user profile information 140. For example, if the user is logged into the personalized news engine 100 the user profile information 140 is readily available. If however, the user is not logged in, the user profile information 140 may have to be derived by the input module 110. The information derived by the input module 110 is employed by the analysis module 120 in conjunction with the information available from the user logs 170 in order to identify preferred news sources.

User profiles are generally built on content features such as entities, terms and content categories that the users are interested in. The users and documents are clustered and collaborative filtering techniques may be employed to match users with news documents. Such techniques rely primarily on content based features for clustering content descriptions in matching users with respective interests. However, identification of user preferences is not a trivial problem and users usually have a complex notion of what is relevant to them. It is often difficult to express user preferences in terms of user profile that only consists of content based features. Hence, in addition to such content based features, the personalized news engine 100 captures user preferences in terms of their preferred news sources. As discussed supra, a strong correlation exists between the geographic location of a user and the geographic location associated with the user's preferred news source. For example, Chicago users prefer news from sources like CHICAGO TRIBUNE as compared to the LOS ANGELES TIMES while San Francisco users may prefer the SAN FRANCISCO CHRONICLE. Accordingly, in a further embodiment, the analysis module 120 selects the user's geographical location information from the user profile information 140 and presents news stories from sources that predominantly publish news items that are associated with the geographic location of the user. For example, based on a derived location information of a user who may not be logged in to personalized new engine 100, the analysis module 120 can obtain from user logs 170 the preferred new sources of other users with similar location information and present news items from such local sources to the user. In one embodiment, the users' location information is obtained in terms of their Designated Market Area (DMA) from their Internet Protocol (IP) address or with the user's GPS coordinates. This is used to match against the location associated with the news sources. A DMA can be a defined area within which a population receives media transmissions including newspapers or Internet content. If it is determined that the user is at the border of two DMAs, then two user groups from one DMA each can be identified as having similar attributes as the requesting user and relevant news items from local news sources associated with both the DMAs can be retrieved for presentation to the user. The news sources can be further ranked based on their proximity to the user's locations.

In further embodiments, other user attributes such as, but not limited to, user age, gender, profession can also be employed in selecting news sources. For example, if it is know from the user profile information 140 that the user is a tech-savvy, headlines or selected news items from a technology news source such as TECHCRUNCH or ENGADGET can be selected or articles from sports related sources may be presented to male users. This is because news stories from these sources are trusted and valued by such users even if sometimes the news articles are varied in their content types. Although user interests may be captured in a few entities such as technology, gadgets and names of a few technological companies, it would add great value to keep a track of the sources to represent the user profile in addition to the content descriptors. Thus, the complex user profiling information can be captured by keeping track of which news sources a user is interested in.

The news items selected by the analysis module 120 from the news repository 150 are communicated to the output module 130 that formats them in an appropriate manner for presentation to the user. In one embodiment, the news repository 150 can be a centralized data storage unit that is updated with news feeds from various sources. The news items can be formatted in accordance with their relevance to a search query entered by a user. In addition, the news items can be selected from a plurality of news sources which are identified by the analysis module 120 as being equally preferred by the user. In this case, the output module 130 can rate the news stories based on other criteria such as, for example, revenue generation criteria or relevance or temporal criteria. For example, news items can be presented in order of their time stamps so that the latest item is presented first to the user. As the news stories/items are selected based on user preferences in news sources rather than on content features, such as entities, terms or content categories, user preferences are more comprehensively addressed in the selection of news items. In yet other embodiments, the news items can be presented ranging from those that relate to the town/city in which the user is located to those that pertain to the country of user location.

The personalized news engine can optionally include a feedback module 160 which receives user selections of the news stories 134 presented by the output module 130. Thus, the feedback module 160 operates to build user logs 170. The user logs 170 can be used to analyze user preferences in making accurate selection of news sources as will be detailed further infra.

Figure 2:
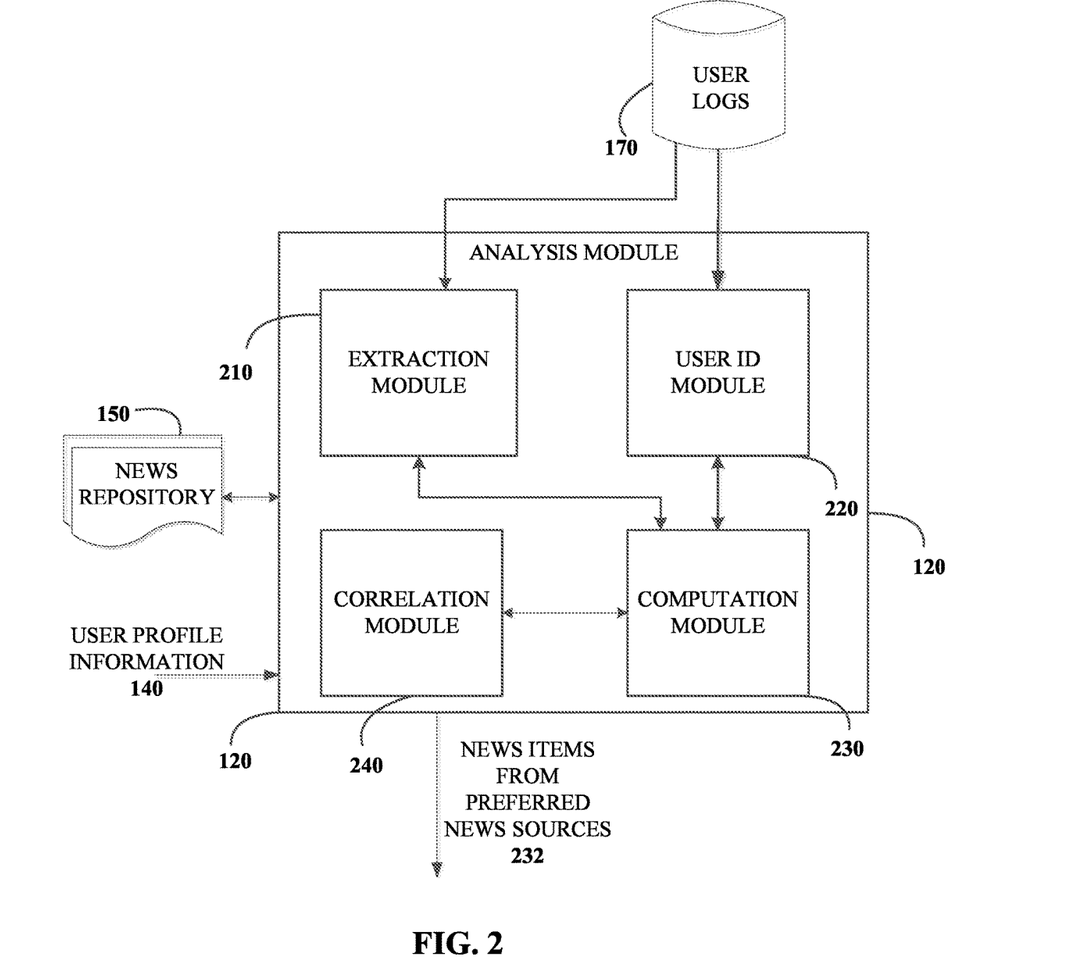
FIG. 2 is a block diagram of modules within the analysis module in accordance with an embodiment of the present disclosure.

FIG. 2 is a block diagram that shows components of the analysis module 120 in accordance with one embodiment. The analysis module 120 interfaces with news repositories 150 and user logs 170 in order to select relevant news articles from preferred news sources of the users. Based on the log in status of the users, the analysis module 120 can access the user preferences and select appropriate news stories from the news repositories 150 for those users who are logged in or it can derive user preferences in news sources based on user data analysis for those users whose user profile information 140 is not readily available. The analysis module 120 determines preferred news sources for those users who are not logged in by interfacing with the user logs 170 which store user profile information and user activity for various news sources.

The analysis module 120 comprises four components, the extraction module 210, the user identification module 220, correlation module 230 and computation module 240. Although four modules are shown, it can be appreciated that this is shown by the way of illustration and not limitation and that the functionality associated with the analysis module 120 can be achieved by more or less number of modules. The extraction module 210 extracts the news source of the different news articles comprised with the user logs 170. Individual news articles generally contain the information regarding a provider or the news publisher information, such as, CNN, NEWYORKTIMES or TECHMEME in the contents of the document itself. Text matching or other natural language processing techniques can be employed to obtain this information. If the news source information is not included in the document, the name of the web site hosting the news article is extracted from the URL of the article and used as a proxy for the news source. For example, an article may not include explicit publisher information but may have been obtained from npr.org. Accordingly, npr.org will be recorded as the news source of the article.

After the news source information is extracted for the news documents, each user click event is associated with both the news source and the user identity information is obtained by the user identity module 220. Anonymized user id information is associated by the user identity module 220 with respective user clicks if the user is logged in. If the user is not logged in, information obtained from GPS coordinates, IP addresses or bcookies and stored therein can be extracted from the user logs 170. Different kinds of user attributes such as, user location, age, gender, interests, social networking data can be derived by the user identity module 220 from the user logs 170. As discussed supra, the user attributes thus collected are employed in promoting news articles put forth by certain news sources as opposed to other news sources.

The information collected by the extraction module 210 and the user identity module 220 is transmitted to the computation module 230 which employs the information to compute different statistics regarding the user groups and news sources. The computation module 230 can identify various user groups/segments in terms of different attributes, such as but not limited to, locations, age groups, gender and other combinations thereof and computes the user preferences for news sources within each of these user groups. If plain counts were used for estimating the popularity of news sources within different user groups, then well known news sources such as CNN or NEW YORK TIMES will generally top the list of preferred news sources for almost every user group. Therefore, while computing basic statistics like number of times a particular user clicks on a specific news source, the computation module 230 is operable to eliminate such news sources which tend to be universally popular across different user groups. This is achieved by smoothing the counts with inverse document frequency of news sources so that sources that are popular in most user groups are penalized. The result is that a discriminative set of news sources that are popular within a specific user group can be obtained for each of the plurality of user groups. In a further embodiment, the results from the computation module 230 can be logged into databases (not shown) stored on computer readable media so that they are readily available for further analysis.

The results from the computation module 230 are employed by the correlation module 240 in conjunction with the user profile information 140 in order to identify preferred news sources for the users. For each user requesting news items, the correlation module 240 obtains the user profile information 140 from the input module 110. As discussed supra, the user profile information includes various attributes of users that are implicitly or explicitly obtained based on the log in status and other information. A user group having similar attributes as the requesting user is identified by the correlation module 240 based on the information obtained from the computation module 230. News sources that are preferred among the identified user group are determined. Relevant news articles 132 from the preferred news sources based on different criteria as described herein are selected by the correlation module 240 from the news repositories 150 for presentation to the user.

Figure 3:
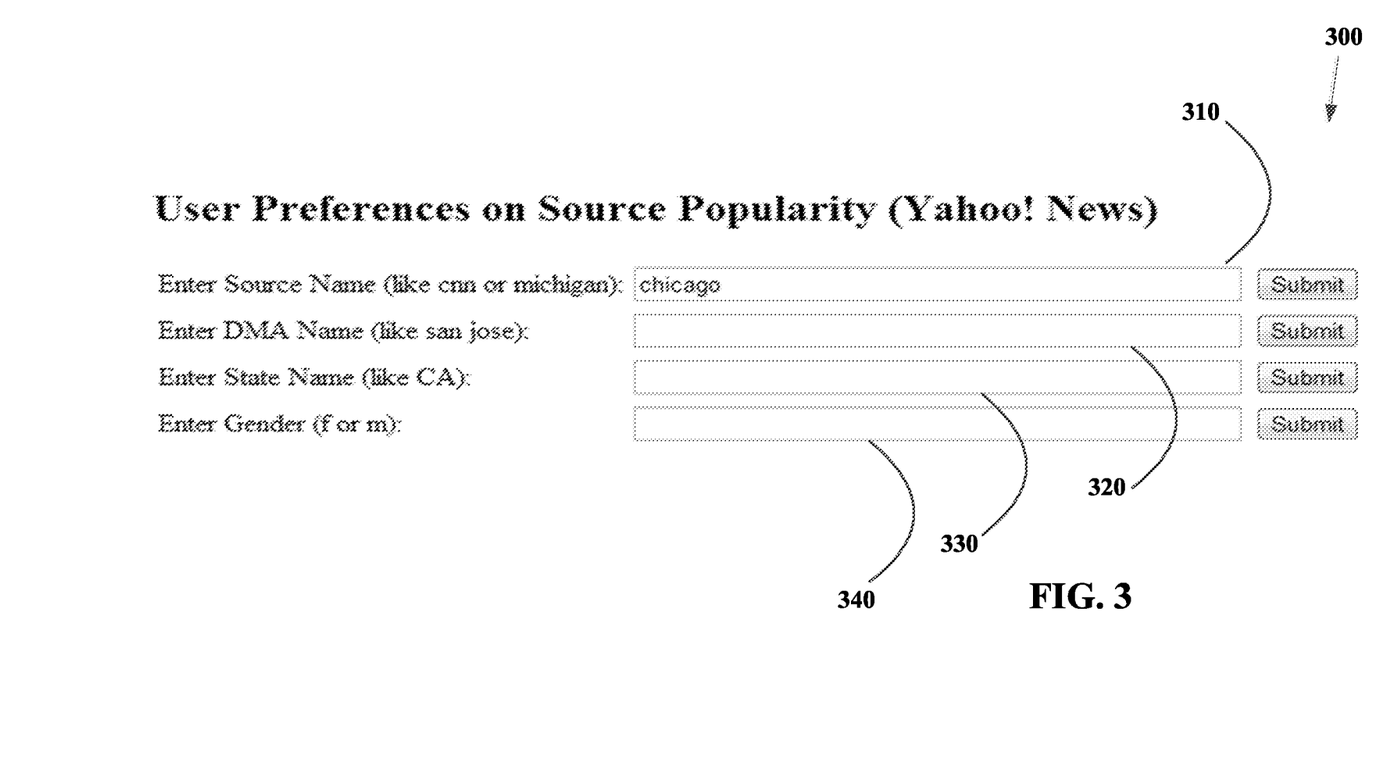
FIG. 3 is a block diagram of an example of a screen that facilitates obtaining user and/or source information from the user logs.

FIG. 3 is a depiction of an example of a screen displayed on a display of a computing device that facilitates obtaining user and/or source information generated by the analysis module 120 from the user logs 170 based on different criteria. In one embodiment, the screen 300 facilitates a business user, such as an analyst to enter different criteria to obtain readership or news source information. A text box 310, facilitates entry of a source name in order to determine the users who accessed the named source. For example, if a name such as CNN or Michigan is entered, the readership data for CNN or sources whose name includes Michigan can be retrieved. Similarly, other text boxes 320, 330 can be provided so that criteria such as the names of locations (DMA name) e.g., San Jose or a state name e.g., CA can be respectively entered in order to determine sources that are popular among users situated in these geographic locations. In one aspect, selection of a locale for a requesting user can be based on the topics of the news items to be presented to the user and accordingly, an appropriate user group can be analyzed to determine preferred news sources. In addition, other known attributes of users, such as gender information, can be entered at 340 in order to obtain news sources that are preferred by male/female users.

Figure 4A:
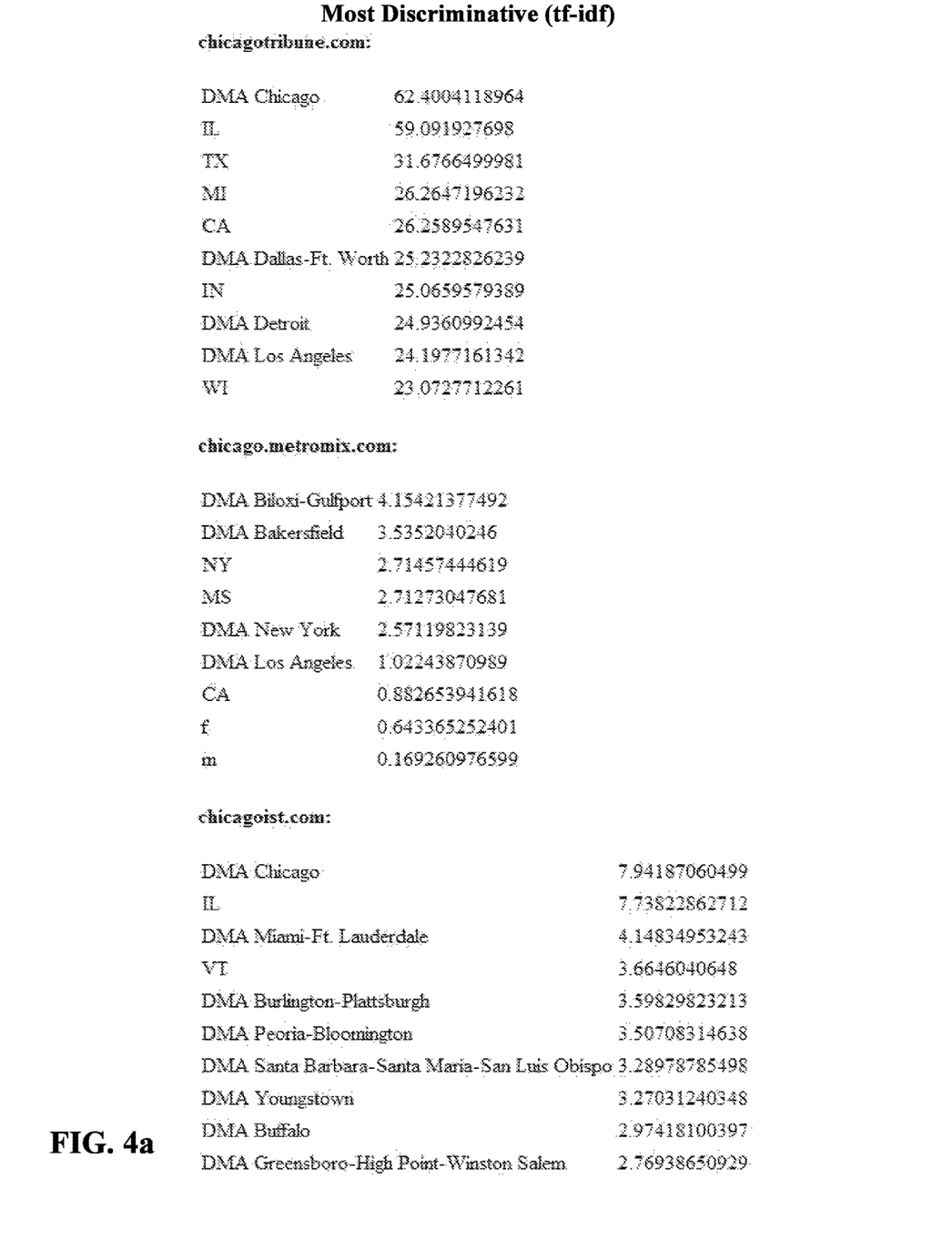
FIG. 4a is an example of information obtained for news sources having a domain name that includes 'Chicago'.

FIG. 4a shows information obtained from the analysis component 120 for news sources having a domain name that includes 'Chicago'. The tf-idf (term frequency-inverse document frequency) statistics are shown here. As seen from the figure, the tf-idf of news source, chicagotribune.com, is highest among readers located in Chicago or Illinois. The tf-idf indicates importance of a word in a document from a corpus and is often used for information retrieval. Therefore, among the documents retrieved by readers from different locations, the tf-idf count for chicagotribune.com is maximum for readers from Chicago. Similarly, the tf-idf count for chicagoist.com is greatest for users from Chicago/Ill. locations as compared to those with VT, Burlington-Plattsburg, Peoria-Bloomington etc. locations. These indicate that users prefer news sources that publish information related to their respective locales.

Figure 4B:
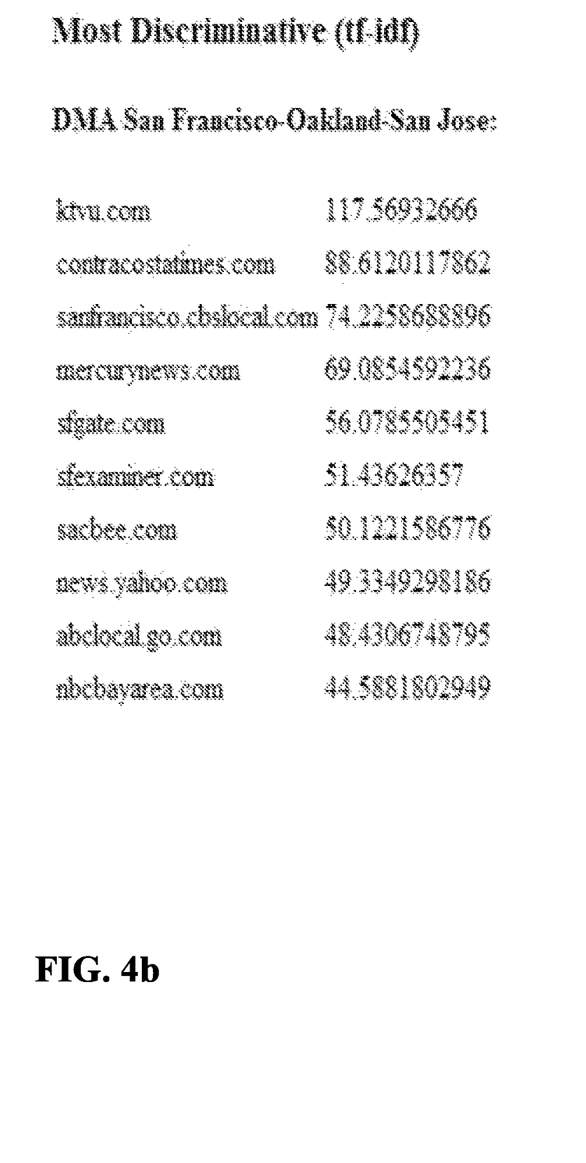
FIG. 4b depicts an example of data retrieved when queried for top news sources that are characteristic of user groups located in San Francisco-Oakland-San Jose metro area.

FIG. 4b shows data retrieved from the user logs 170 when queried for top news sources in San Francisco-Oakland-San Jose DMA. The data shows that ktvu.com is the most popular local news source for users from this area followed by other news sources like contracostatimes.com, sanfrancisco.cbslocal.com etc. Again, the popularity of the news sources is determined by the tf-idf count of documents retrieved for each of the news sources by users from this area. The foregoing data indicates that there is a strong bias in user preferences to choose local news papers over the news papers from a different region. In addition, the trends also indicate that users of specific age groups of particular gender prefer particular news sources. Therefore, analyzing user logs and associating the news source information with the user identity information leads to deep personalization of news that is specific to a particular user.

Figure 5:
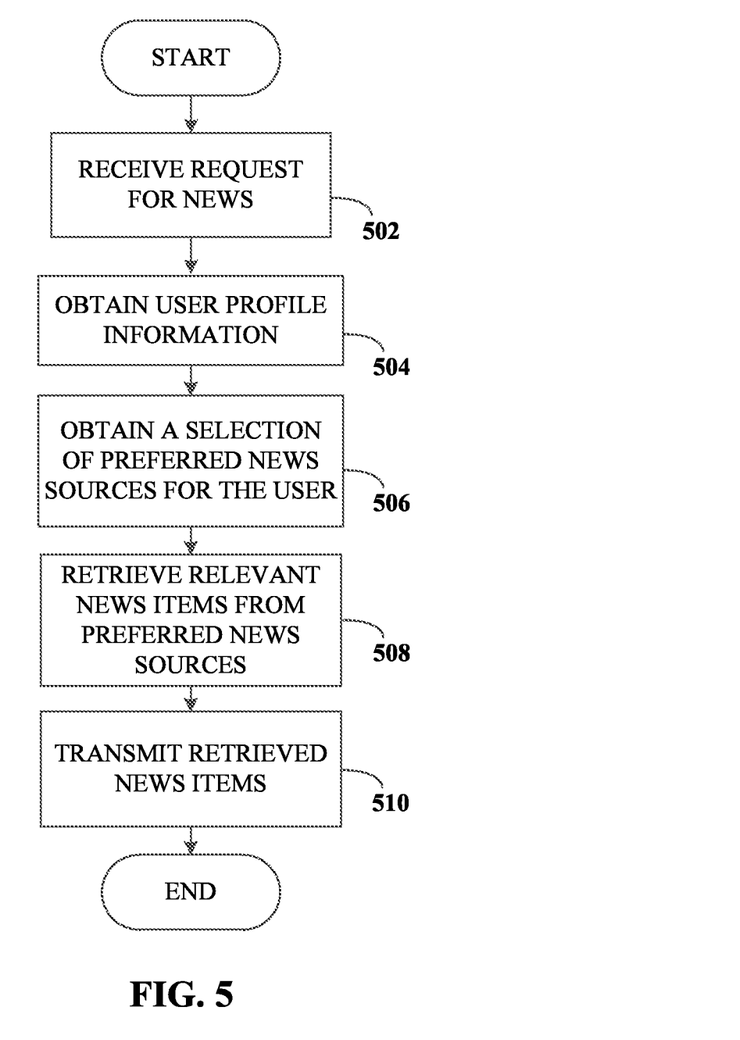
FIG. 5 depicts a flowchart illustrating an embodiment of a method performed while providing relevant news items from preferred news sources to a requesting user.

FIG. 5 shows a flowchart illustrating an embodiment of a method performed while providing relevant news items from preferred news sources to a requesting user. The procedure commences at step 502 with the server receiving a user request for news items. The user request can be received explicitly as a user query comprising query terms that need to be searched or the user request can be received implicitly via a user accessing a webpage associated with the personalized news engine 100. At step 504, profile information associated with the user is obtained. As discussed herein, the user can log in to the personalized news engine 100 thereby providing explicit and/or implicit information regarding user interests and behavior. Additional profile information is obtained indirectly via device information of the user. For example, GPS information of mobile devices or IP addresses of client computers accessing the webpage of the personalized news engine can be part of the user profile information. For a user who is logged in, the additional information can be combined with known or declared interests/attributes of the user to select appropriate news sources. Alternately, if a user is not logged in, the device information can be used to at least obtain the geographic location of the user. At 506, a selection of the preferred news sources is obtained for the user. As discussed supra, various user attributes, such as, location, age, gender, declared user interests can be used to select preferred news sources as disclosed in accordance with various aspects detailed herein. At 508, relevant news items are retrieved from the selected news sources. The relevant news items can be selected based on terms in a user query in accordance with one aspect. In another aspect, the relevant news items could be selected based on chronological order. For example, if a user is logging into a customized home page of the personalized news engine 100, the latest news items from the user's preferred news sources can be presented. At step 510, the retrieved news items are transmitted to the requesting user.

Figure 6:
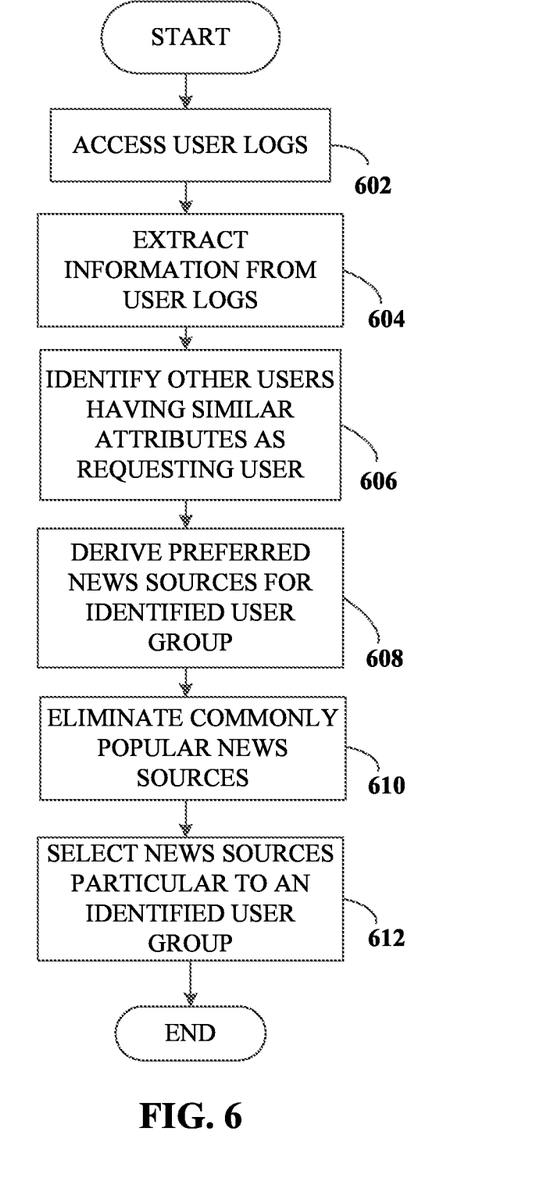
FIG. 6 depicts a flowchart illustrating an embodiment of a method of selecting preferred news sources for a requesting user.

As discussed supra, if a user is logged in the user profile information can be employed to identify the user's preferred news sources. Alternately, if a requesting user is not logged in, the preferred news sources of the user have to be determined based on the user profile information gathered by the personalized news engine 100. To this end, FIG. 6 shows a flowchart illustrating an embodiment of a method of selecting preferred news sources for a requesting user. The method commences at step 602 wherein the user logs are accessed. The user logs comprise user activity information associated with the various news sources in conjunction with user profile data. As discussed supra, the user logs can be updated with user profile information obtained by the personalized news engine 100 in addition to recording user selections. The profile information or user attributes and the news source selections of other users are extracted from the user logs as shown at 604. At 606, other users who have attributes similar to that of the requesting user are identified. For example, if the user location is known, other users with similar location information are identified as those with similar attributes. In addition, user attributes such as explicitly or implicitly declared interests, gender, or social networking information can be used to identify other users who match the profile of the requesting user. The preferred news sources of the other users with matching profiles are derived as shown at 608. The set of news sources that are preferred by the other users can include those which are common across the various user groups at different locations. For example, national or international news sources such as CNN or REUTERS are usually selected as popular news sources among users from different locations. Therefore, at step 610, such news sources that are commonly popular among various user groups are eliminated. Upon elimination of universally popular news sources from the set of preferred news sources, a subset of news sources that are peculiar or characterize a user group will remain as shown at step 612 for retrieval of relevant news items to be presented to the user. As users tend to prefer news sources that publish information associated with their respective locations and/or are inherently based on specific content category such as TECHCRUNCH, WEBMD and THE HUFFINGTON POST, the retrieval of news items from such preferred news sources aids in personalization of news according to user interests.

Figure 7:
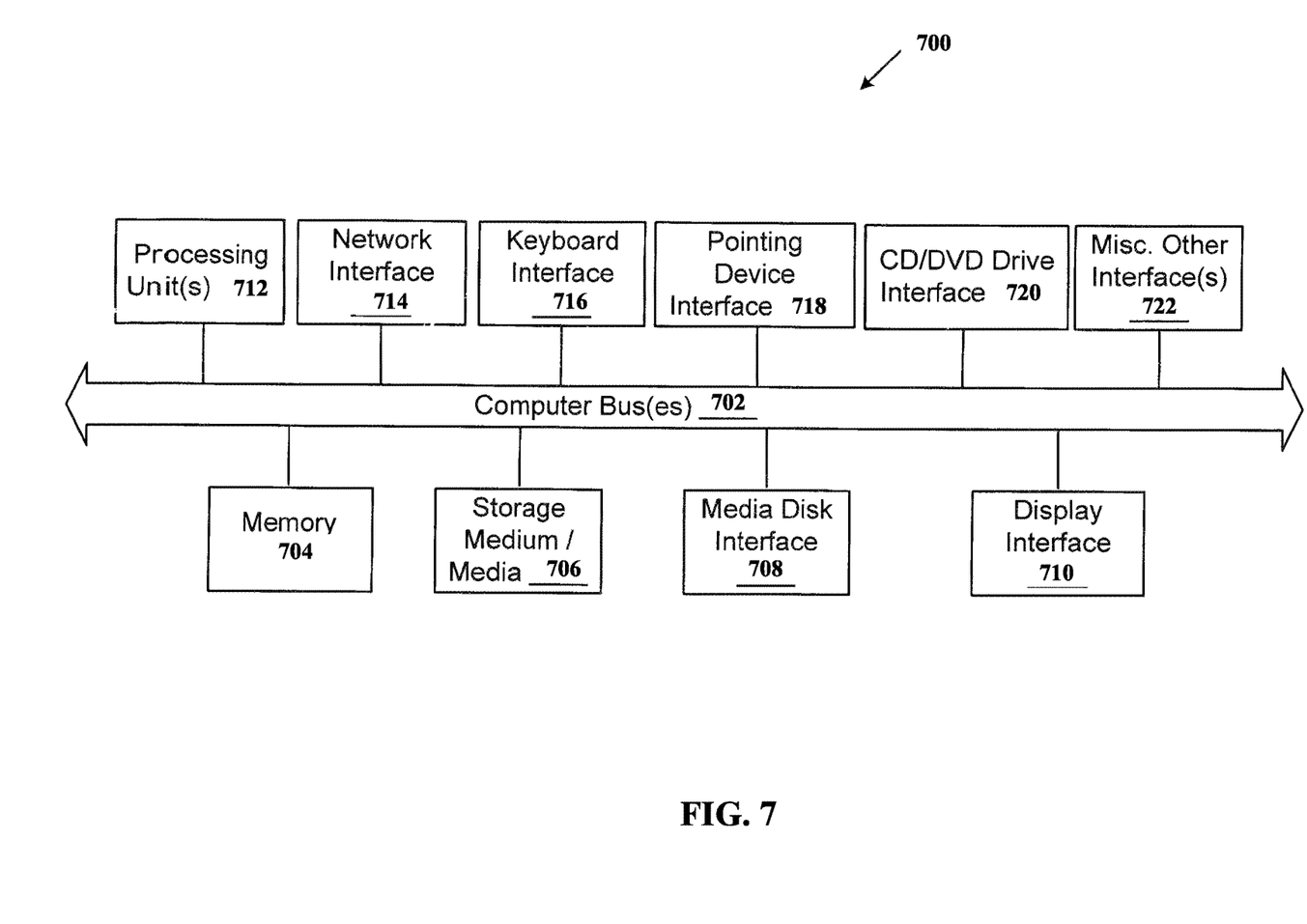
FIG. 7 is a block diagram illustrating an internal architecture of an example of a computing device in accordance with embodiments of the present disclosure.

FIG. 7 is a block diagram illustrating an internal architecture of an example of a computing device, such as server computer 106 and/or user computer 102, in accordance with one or more embodiments of the present disclosure. A computer as referred to herein refers to any device with a processor capable of executing logic or coded instructions, and could be a server, personal computer, set top box, smart phone, tablet computer, network appliance or media device, to name a few such devices.

As shown in the example of FIG. 7, internal architecture 700 includes one or more processing units (also referred to herein as CPUs) 712, which interface with at least one computer bus 702. Also interfacing with computer bus 702 are persistent storage medium/media 706, network interface 714, memory 704, e.g., random access memory (RAM), run-time transient memory, read only memory (ROM), etc., media disk drive interface 708 as an interface 720 for a drive that can read and/or write to media including removable media such as floppy, CD-ROM, DVD, etc. media, display interface 710 as interface for a monitor or other display device, keyboard interface 716 as interface for a keyboard, pointing device interface 718 as an interface for a mouse or other pointing device, and miscellaneous other interfaces 722 not shown individually, such as parallel and serial port interfaces, a universal serial bus (USB) interface, and the like.

Memory 704 interfaces with computer bus 702 so as to provide information stored in memory 704 to CPU 712 during execution of software programs such as an operating system, application programs, device drivers, and software modules that comprise program code, and/or computer-executable process steps, incorporating functionality described herein, e.g., one or more of process flows described herein. CPU 712 first loads computer-executable process steps from storage, e.g., memory 704, storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage medium/media 706 is a computer readable storage medium(s) that can be used to store software and data, e.g., an operating system and one or more application programs. Persistent storage medium/media 706 can also be used to store device drivers, such as one or more of a digital camera driver, monitor driver, printer driver, scanner driver, or other device drivers, web pages, content files, playlists and other files. Persistent storage medium/media 706 can further include program modules and data files used to implement one or more embodiments of the present disclosure.

Figure 8:
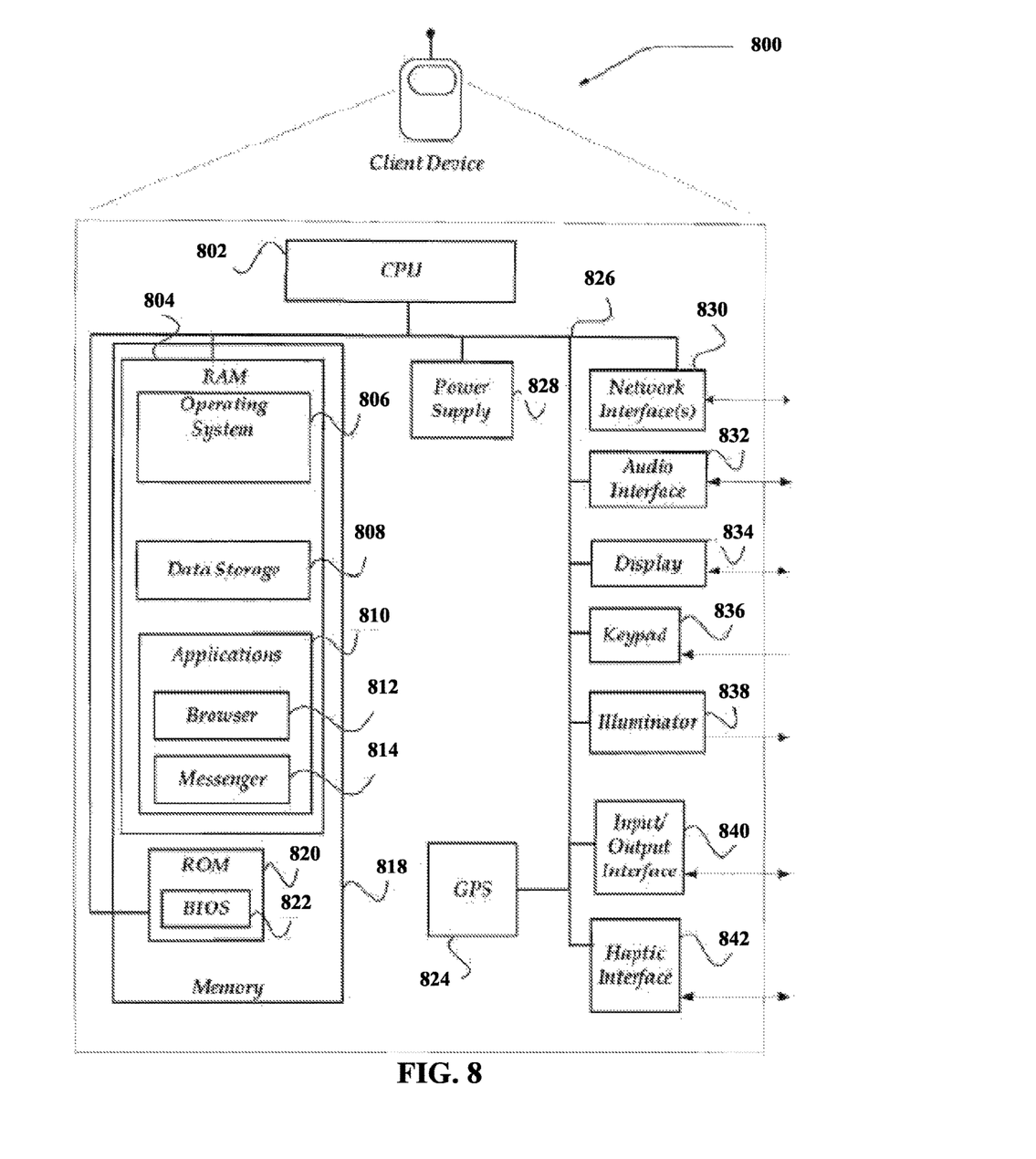
FIG. 8 is a schematic diagram illustrating a client device in accordance with embodiments of the present disclosure.

FIG. 8 is a schematic diagram illustrating a client device in accordance with embodiments of the present disclosure. A client device 800 may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. The client device can include standard components such as a CPU 802, power supply 828, a memory 818, ROM 820, BIOS 822, network interface(s) 830, audio interface 832, display 834, keypad 836, illuminator 838, I/O interface 840. Claimed subject matter is intended to cover a wide range of potential variations. For example, the keypad 836 of a cell phone may include a numeric keypad or a display 834 of limited functionality, such as a monochrome liquid crystal display (LCD) for displaying text. In contrast, however, as another example, a web-enabled client device 800 may include one or more physical or virtual keyboards 836, mass storage, one or more accelerometers, one or more gyroscopes, global positioning system (GPS) 824 or other location identifying type capability, Haptic interface 842, or a display with a high degree of functionality, such as a touch-sensitive color 2D or 3D display, for example. The memory 818 can include Random Access Memory 804 including an area for data storage 808.

A client device may include or may execute a variety of operating systems 806, including a personal computer operating system, such as a Windows, iOS or Linux, or a mobile operating system, such as iOS, Android, or Windows Mobile, or the like. A client device 800 may include or may execute a variety of possible applications 810, such as a client software application 814 enabling communication with other devices, such as communicating one or more messages such as via email, short message service (SMS), or multimedia message service (MMS), including via a network, such as a social network, including, for example, Facebook, LinkedIn, Twitter, Flickr, or Google+, to provide only a few possible examples. A client device 800 may also include or execute an application to communicate content, such as, for example, textual content, multimedia content, or the like. A client device 800 may also include or execute an application 812 to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method of providing news, comprising:
   receiving, by a processor, a request for news items from a user;
   identifying, by the processor, a geographic location of the requesting user, the identifying of the geographic location comprising identifying the geographic location from a Designated Market Area (DMA);
   matching, by the processor, the geographic location of the requesting user with geographic locations associated with news sources;
   identifying, by the processor, a geographic location of local news sources that is from the same DMA as the geographic location of the requesting user, the identifying comprising obtaining preferred news sources of other users that are located within a similar geographic location as the requested user and eliminating used sources that are popular across multiple other geographic areas;
   obtaining, by the processor, relevant news items from the identified local news sources; and
   transmitting, by the processor, the relevant news items for presentation to the requesting user.

2. The method of claim 1, further comprising ranking, by the processor, the local news sources based on their proximity to the geographic location of the user.

3. The method of claim 1, wherein the geographic location of the requesting user is derived from one of an IP address or GPS information of a device employed by the requesting user.

4. The method of claim 1, further comprising identifying, by the processor, a user profile associated with the requesting user.

5. The method of claim 4, further comprising identifying, by the processor from the geographic location and from the user profile, a preferred news source.

6. The method of claim 5, wherein the identifying of the preferred news source further comprises matching a geographic location of the preferred news source with the geographic location of the requesting user.

7. The method of claim 1, further comprising determining, by the processor, that the user is at a border of two DMAs.

8. The method of claim 7, further comprising identifying, by the processor, two user groups from one DMA each as having similar attributes as the requesting user and relevant news items from local news sources associated with both the DMAs is retrieved for presentation to the user.

9. A computing device, comprising:
   a processor;
   a storage medium for tangibly storing thereon program logic for executing by the processor, the program logic comprising:
      receiving logic, executed by the processor, for receiving a request for news items from a user;
      identifying logic, executed by the processor, for identifying a geographic location of the requesting user, the identifying of the geographic location comprising identifying the geographic location from a Designated Market Area (DMA);
      matching logic, executed by the processor, for matching the geographic location of the requesting user with geographic locations associated with news sources;
      identifying logic, executed by the processor, for identifying a geographic location of local news sources that is from the same DMA as the geographic location of the requesting user, the identifying comprising obtaining preferred news sources of other users that are located within a similar geographic location as the requested user and eliminating used sources that are popular across multiple other geographic areas;
      obtaining logic, executed by the processor, for obtaining relevant news items from the identified local news sources; and
      transmitting logic, executed by the processor, for transmitting the relevant news items for presentation to the requesting user.

10. The device of claim 9, further comprising ranking logic, executed by the processor, for ranking the local news sources based on their proximity to the geographic location of the user.

11. The device of claim 9, further comprising user profile identifying logic, executed by the processor, for identifying a user profile associated with the requesting user.

12. The device of claim 11, further comprising preferred news source identifying logic, executed by the processor, for identifying, from the geographic location and from the user profile, a preferred news source.

13. The device of claim 12, wherein the preferred news source identifying logic further comprises location matching logic for matching a geographic location of the preferred news source with the geographic location of the requesting user.

14. The device of claim 9, further comprising border determining logic, executed by the processor, for determining that the user is at a border of two DMAs.

15. The device of claim 14, further comprising group identifying logic, executed by the processor, for identifying two user groups from one DMA each as having similar attributes as the requesting user and relevant news items from local news sources associated with both the DMAs is retrieved for presentation to the user.

16. A non-transitory computer-readable storage medium tangibly storing thereon computer program instructions capable of being executed by a computer processor, the computer program instructions defining the steps of:
   receiving, by a processor, a request for news items from a user;
   identifying, by the processor, a geographic location of the requesting user, the identifying of the geographic location comprising identifying the geographic location from a Designated Market Area (DMA);
   matching, by the processor, the geographic location of the requesting user with geographic locations associated with news sources;
   identifying, by the processor, a geographic location of local news sources that is from the same DMA as the geographic location of the requesting user, the identifying comprising obtaining preferred news sources of other users that are located within a similar geographic location as the requested user and eliminating used sources that are popular across multiple other geographic areas;
   obtaining, by the processor, relevant news items from the identified local news sources; and
   transmitting, by the processor, the relevant news items for presentation to the requesting user.

17. The medium of claim 16, the instructions further defining the step of ranking, by the processor, the local news sources based on their proximity to the geographic location of the user.

18. The medium of claim 16, the instructions further defining the step of identifying, by the processor, a user profile associated with the requesting user.

19. The medium of claim 18, the instructions further defining the step of identifying, by the processor from the geographic location and from the user profile, a preferred news source.

20. The medium of claim 16, wherein the identifying of the preferred news source further comprises matching a geographic location of the preferred news source with the geographic location of the requesting user.

21. The medium of claim 1, the instructions further defining the step of determining, by the processor, that the user is at a border of two DMAs.

22. The medium of claim 21, the instructions further defining the step of identifying, by the processor, two user groups from one DMA each as having similar attributes as the requesting user and relevant news items from local news sources associated with both the DMAs is retrieved for presentation to the user.

23. A method of providing news, comprising:
   receiving, by a processor, a request for news items from a user;
   identifying, by the processor, a geographic location of the requesting user, the identifying of the geographic location comprising identifying the geographic location from a group of location identifiers consisting of a Designated Market Area (DMA), a user preference, and GPS coordinates;
   matching, by the processor, the geographic location of the requesting user with geographic locations associated with news sources;
   identifying, by the processor, a geographic location of local news sources that is from the same geographic location of the requesting user, the identifying comprising obtaining preferred news sources of other users that are located within a similar geographic location as the requested user and eliminating used sources that are popular across multiple other geographic areas;
   obtaining, by the processor, relevant news items from the identified local news sources; and
   transmitting, by the processor, the relevant news items for presentation to the requesting user.

* * * * *